(12) United States Patent
Winterhalter et al.

(10) Patent No.: US 10,684,385 B2
(45) Date of Patent: Jun. 16, 2020

(54) SENSOR HAVING ROTATIONALLY OFFSET COIL PAIRS AND DIFFERENTLY FORMED RECEIVING COILS FOR LOCATING METAL OR MAGNETIC OBJECTS

(71) Applicant: Robert Bosch GmbH, Stuttgart (DE)

(72) Inventors: Juergen Winterhalter, Stuttgart (DE); Tobias Zibold, Stuttgart (DE); Andrej Albrecht, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 338 days.

(21) Appl. No.: 14/654,136

(22) PCT Filed: Oct. 25, 2013

(86) PCT No.: PCT/EP2013/072369
§ 371 (c)(1),
(2) Date: Jun. 19, 2015

(87) PCT Pub. No.: WO2014/095135
PCT Pub. Date: Jun. 26, 2014

(65) Prior Publication Data
US 2015/0355361 A1    Dec. 10, 2015

(30) Foreign Application Priority Data
Dec. 20, 2012  (DE) .......................... 10 2012 223 875

(51) Int. Cl.
*G01V 3/10* (2006.01)
*G01V 3/15* (2006.01)

(52) U.S. Cl.
CPC .............. *G01V 3/104* (2013.01); *G01V 3/107* (2013.01); *G01V 3/15* (2013.01)

(58) Field of Classification Search
CPC . G01V 3/08; G01V 3/081; G01V 3/10; G01V 3/101; G01V 3/102; G01V 3/104;
(Continued)

(56) References Cited

U.S. PATENT DOCUMENTS

| 4,405,896 A | * | 9/1983 | Akita | ..................... G01D 5/204 324/173 |
| 4,810,966 A | | 3/1989 | Schmall | |

(Continued)

FOREIGN PATENT DOCUMENTS

| CN | 101031822 A | 9/2007 |
| CN | 102428390 A | 4/2012 |

(Continued)

OTHER PUBLICATIONS

International Search Report corresponding to PCT Application No. PCT/EP2013/072369, dated May 8, 2014 (German and English language document) (5 pages).

*Primary Examiner* — David M Schindler
(74) *Attorney, Agent, or Firm* — Maginot, Moore & Beck LLP

(57) ABSTRACT

A sensor for locating metal or magnetic objects includes a first and a second transmitting coil and one receiving coil. The receiving coil includes a first and a second receiving sub-coil. The first transmitting coil and the first receiving sub-coil are arranged in a first plane. The second transmitting coil and the second receiving sub-coil are arranged in a second plane. The first transmitting coil and the first receiving sub-coil are offset in relation to the second transmitting coil and the second receiving sub-coil with respect to a common center axis which passes vertically through the planes. The first receiving sub-coil is configured differently than the second receiving sub-coil.

9 Claims, 3 Drawing Sheets

(58) Field of Classification Search
CPC ........ G01V 3/105; G01V 3/107; G01V 3/108; G01V 3/15; G01D 5/20; G01D 5/2006; G01D 5/204; G01D 5/22; G01D 5/2208
See application file for complete search history.

(56) References Cited

U.S. PATENT DOCUMENTS

| | | | | |
|---|---|---|---|---|
| 5,719,500 | A * | 2/1998 | Eschner | F41H 11/16 |
| | | | | 324/329 |
| 6,043,644 | A * | 3/2000 | de Coulon | G01P 3/488 |
| | | | | 324/164 |
| 2010/0181989 | A1 * | 7/2010 | Reime | G01D 5/20 |
| | | | | 324/76.11 |
| 2012/0049850 | A1 * | 3/2012 | Reime | G01V 3/107 |
| | | | | 324/329 |
| 2014/0117980 | A1 * | 5/2014 | Ely | G01B 7/30 |
| | | | | 324/207.17 |
| 2015/0260669 | A1 * | 9/2015 | Bittar | G01N 27/025 |
| | | | | 324/324 |

FOREIGN PATENT DOCUMENTS

| | | |
|---|---|---|
| DE | 44 23 661 A1 | 1/1996 |
| DE | 10 2009 021 804 A1 | 11/2010 |
| DE | 10 2011 085 876 A1 | 5/2013 |
| EP | 0 130 940 A1 | 1/1985 |
| JP | 9-304546 A | 11/1997 |
| JP | 2000-56032 A | 2/2000 |
| WO | 02/091021 A1 | 11/2002 |
| WO | 2010/133328 A1 | 11/2010 |
| WO | WO-2010133501 A1 * 11/2010 ............. G01V 3/107 |

* cited by examiner

SENSOR HAVING ROTATIONALLY OFFSET COIL PAIRS AND DIFFERENTLY FORMED RECEIVING COILS FOR LOCATING METAL OR MAGNETIC OBJECTS

This application is a 35 U.S.C. § 371 National Stage Application of PCT/EP2013/072369, filed on Oct. 25, 2013, which claims the benefit of priority to Serial No. DE 10 2012 223 875.1, filed on Dec. 20, 2012 in Germany, the disclosures of which are incorporated herein by reference in their entirety.

The present disclosure relates to a sensor for locating metal or magnetic objects.

BACKGROUND

A sensor for locating metal or magnetic objects is known in the related art from WO 2010/133328 A1, wherein two transmitting coils and one receiving coil are provided. The transmitting coils and the receiving coil are inductively coupled to one another and are arranged in a partially overlapping manner in order to decouple interaction. In addition, a control circuit is provided which is configured to cause the receiving voltage in the receiving coil to disappear. A first transmitting coil is arranged with a first receiving coil in a first plane. A second transmitting coil is arranged with a second receiving coil in a second plane. The transmitting and receiving coils of the first plane are rotated through an angle with respect to the transmitting and receiving coils of the second plane. In addition, the common central axes of each of the pairs of transmitting and receiving coils arranged in a plane are displaced relative to one another.

SUMMARY

The object of the present disclosure is to provide an improved sensor for locating metal and magnetic objects.

The object of the present disclosure is achieved via the sensor described herein.

Additional advantageous specific embodiments of the present disclosure are specified in the dependent claims.

One advantage of the sensor with respect to the known related art is that no displacement of the central axes of the coil arrangements of the various planes, which results in a degradation of the signal-noise ratio, is required.

An additional advantage is the adjustment of manufacturing tolerances by varying the inductance of the receiving subcoils. As a result, manufacturing tolerances and electrical properties of switches, solder bridges, etc. which change over time and as a function of ambient conditions are adjusted. In the related art, an analog adjustment of manufacturing tolerances requires an additional displacement of the central axes, which is not possible if the coils are arranged as printed coils on a front or rear side of a single printed circuit board.

An additional advantage of the current disclosure is that the ohmic resistance and the inductance of the two transmitting coils are identical within the scope of the manufacturing tolerances; therefore, identical amplitudes and phases of the AC voltages exciting the transmitting coils result in identical transmitting currents. This facilitates a simultaneous inductive and capacitive matching of the transmitting coils.

In one specific embodiment, the areas enclosed by the windings of the receiving subcoils differ. As a result, different inductances, which are also precisely defined, may be produced in a simple manner.

In one specific embodiment, the number of windings of the receiving subcoils differs.

In an additional specific embodiment, an average diameter of the windings of the first receiving subcoil is different from the average diameter of the windings of the second receiving subcoil.

In an additional specific embodiment, the windings of the first receiving subcoil, in particular partially circular and/or straight sections of the windings, have different spacings from one another in comparison to windings of the second receiving subcoil.

BRIEF DESCRIPTION OF THE DRAWINGS

The present disclosure is explained in greater detail below based on the figures.

DETAILED DESCRIPTION

A basic principle of the sensor is to generate electromagnetic fields with the aid of transmitting coils and to detect a disturbance of the electromagnetic fields due to magnetic or metal objects with the aid of a receiving coil. A receiving voltage is generated in the receiving coil by the electromagnetic fields generated by the transmitting coils, based on Maxwell's equations. If the sensor is moved into the vicinity of a magnetic or metal object, the electromagnetic fields change. This in turn causes a change in the receiving voltage. The change in the receiving voltage is detected and evaluated with the aid of sensor electronics. The matching of the receiving coil and the transmitting coils is relatively complex and may, for example, be highly degraded due to manufacturing imprecision of the elements of the receiving coil.

To improve the robustness of the sensor with respect to manufacturing imprecision, it is advantageous to form the receiving coil in two receiving subcoils and to form the inductance, i.e., the sensitivity of the receiving subcoils for generating an electric voltage for the same electromagnetic field, differently. For this purpose, the receiving subcoils may, for example, have a different number of windings. In addition, the windings of the receiving subcoils may delimit areas having different sizes. Any area which is delimited by a winding contributes to the inductance. The differences in the inductance are, for example, 0.1% or more of the inductance of the receiving subcoil having the higher inductance.

Figure 1:
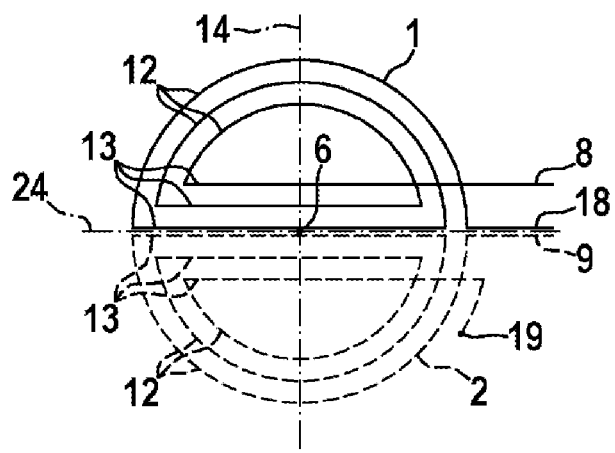
FIG. 1 shows a first transmitting coil including a receiving subcoil.

FIG. 1 shows a schematic representation of a first transmitting coil 1 whose windings are formed in a D shape and which is arranged in a first plane of the sensor. The first transmitting coil 1 has windings having arc-shaped sections 12 which are connected to straight sections 13. The arc-shaped first sections 12 are arranged symmetrically with respect to one another. The outermost arc-shaped section 12 almost forms a full semicircle. The outermost arc-shaped section 12 has a radial first center point 6. A first line 14 is plotted through the first center point 6, which runs in the first plane. A second line 24 is plotted perpendicular to the first line 14, which also runs in the first plane. The straight sections 13 of the first transmitting coil 1 are arranged perpendicular to the first line 14. The straight sections 13 and the arc-shaped sections 12 of the first transmitting coil 1 are arranged mirror-symmetrically with respect to the first line 14. Radial center points of the arc-shaped sections are arranged along the first line 14. The radii of the individual arc-shaped sections 12 each differ, for example, by the same value. The lengths of each of the individual arc-shaped sections 12 decrease from the outside to the inside, for example, by the same value.

A first receiving subcoil 2 is arranged in the plane of the first transmitting coil 1, the windings of which are also formed in a D shape. The first receiving subcoil 2 has windings having arc-shaped sections 12 which are connected to the straight sections 13. The arc-shaped first sections 12 are arranged symmetrically with respect to one another. The outermost arc-shaped section 12 almost forms a full semicircle. The outermost arc-shaped section 12 has the first center point 6 as a circle center. The straight sections 13 are arranged perpendicularly to the first line 14. The straight sections 13 and the arc-shaped sections 12 of the first receiving subcoil 2 are arranged mirror-symmetrically with respect to the first line 14. Radial center points of the arc-shaped sections 12 are arranged along the first line 14. The radii of the individual arc-shaped sections 12 each differ, for example, by the same value. The lengths of each of the individual arc-shaped sections 12 decrease from the outside to the inside, for example, by the same value.

The first transmitting coil 1 and the first receiving coil 2 are essentially arranged mirror-symmetrically opposite with respect to the second line 24. In the depicted exemplary embodiment, the first receiving subcoil 2 is formed almost identically to the first transmitting coil 1. The first transmitting coil 1 has the same number of windings, and the arc-shaped sections 12 have the same radii as the windings of the first receiving subcoil 2.

The first transmitting coil 1 has first leads 8, 18. The first receiving subcoil 2 has a second lead 9 and a via 19 to a second plane. The first transmitting coil is supplied with a transmitting current via the first leads 8, 18. A receiving signal at the first receiving subcoil 2 is tapped via the second lead 9.

Figure 2:
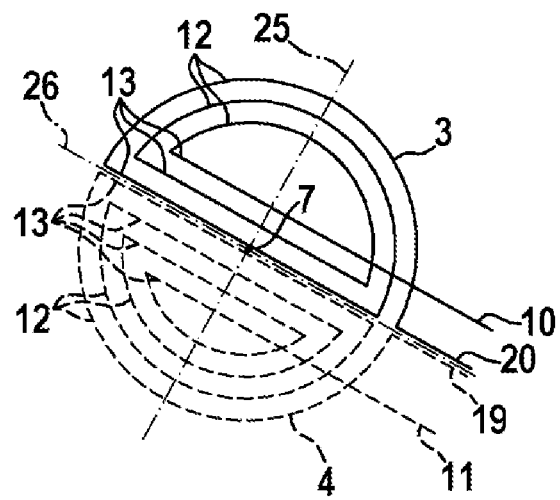
FIG. 2 shows a second transmitting coil including a second receiving subcoil.

FIG. 2 shows a second transmitting coil 3 which is arranged in a second plane of the sensor, the windings of which are also formed in a D shape. The second transmitting coil 3 has windings having arc-shaped sections 12 which are connected to straight sections 13. The arc-shaped first sections 12 are arranged symmetrically with respect to one another. The outermost arc-shaped section 12 almost forms a full semicircle. The outermost arc-shaped section 12 has a radial second center point 7. A first additional line 25, which is arranged in the second plane, is plotted through the second center point 7. A second additional line 26, which is arranged in the second plane, is plotted perpendicular to the first additional line 24. The straight sections 13 are arranged perpendicularly to the first additional line 25. The straight sections and the arc-shaped sections 12 of the second transmitting coil 3 are arranged mirror-symmetrically with respect to the first additional line 25. Radial center points of the arc-shaped sections are arranged along the first additional line 25. The radii of the individual arc-shaped sections 12 each differ, for example, by the same value. The lengths of each of the individual arc-shaped sections 12 decrease from the outside to the inside, for example, by the same value.

A second receiving subcoil 4 is arranged in the plane of the second transmitting coil 3, the windings of which are also formed in a D shape. The second receiving subcoil 4 has windings having arc-shaped sections 12 which are connected to straight sections 13. The arc-shaped first sections 12 are arranged symmetrically with respect to one another. The outermost arc-shaped section 12 almost forms a full semicircle. The outermost arc-shaped section 12 of the second receiving subcoil 4 has the second center point as a circle center. The straight sections 13 are arranged perpendicularly to the first additional line 25. The straight sections 13 and the arc-shaped sections 12 of the second receiving subcoil 4 are arranged mirror-symmetrically with respect to the first additional line 25. Radial center points of the arc-shaped sections are arranged along the first additional line 25. The radii of the individual arc-shaped sections 14 each differ, for example, by the same value. The second transmitting coil 3 and the second receiving subcoil 4 are arranged mirror-symmetrically on opposite sides with respect to the second additional line 26. The lengths of each of the individual arc-shaped sections 12 decrease from the outside to the inside, for example, by the same value.

The second transmitting coil 3 has third leads 10, 20, via which a transmitting current is supplied to the second transmitting coil 3. In addition, the second receiving coil 4 is connected to the first receiving subcoil 2 via the via 19. The second receiving subcoil 4 has a fourth lead 11 via which a receiving signal detected by the first and the second receiving subcoil 4 may be tapped.

The second transmitting coil 3 is formed identically to the first transmitting coil 1. The second receiving subcoil 4 is formed differently from the first receiving subcoil 2. In the depicted exemplary embodiment, the second receiving subcoil 4 includes an additional inner winding having an additional inner arc-shaped section 12 and a straight section 13. The outermost arc-shaped section of the second receiving subcoil 4 has the same radius as the outermost arc-shaped section 12 of the second transmitting coil 3. Depending on the selected embodiment, the second receiving subcoil 4 may also have an additional outer winding.

Figure 3:
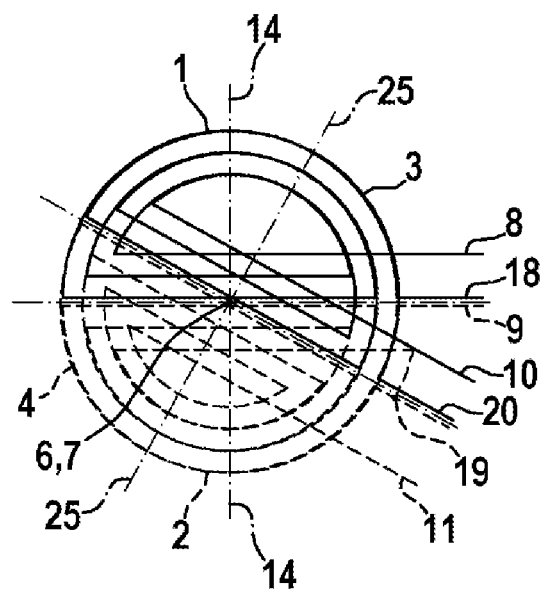
FIG. 3 shows the arrangement of the transmitting and receiving subcoils one above the other in two planes.

FIG. 3 shows a schematic representation of the arrangement of the two transmitting coils 1, 3 and the two receiving subcoils 3, 4 of FIGS. 1 and 2 according to one arrangement in a sensor in which the two planes are arranged one above the other. For example, the first transmitting coil 1 and the first receiving subcoil 2 are arranged on a first side of a printed circuit board, and the second transmitting coil 3 and the second receiving subcoil 4 are arranged on a second side. The first and the second receiving subcoil 2, 4 are connected to a receiving coil. The transmitting and receiving subcoils are arranged in such a way that the first and the second center point 6, 7 coincide. The transmitting and receiving subcoil of the two planes are rotated relative to one another, so that the first line 14 and the first additional line 25 are at an angle relative to one another. In the depicted example, the angle is approximately 45°. Typical angles for coils having 40 windings, a diameter of 4 cm, and a spacing between the planes of 1.5 mm lie in the range between 65° and 70°.

In the depicted example, the second receiving subcoil 4 has a greater number of windings than the first receiving subcoil 2, wherein the number of windings of the second receiving subcoil 4 is greater by an integer value or a fractional value.

Depending on the specific embodiment, the number of windings of the first receiving subcoil 2 may also be greater than the number of windings of the second receiving subcoil 4. The first and the second transmitting coil 1, 3 are preferably formed identically, i.e., they have the same number of windings and the same radii for the arc-shaped first sections 12.

Figure 4:
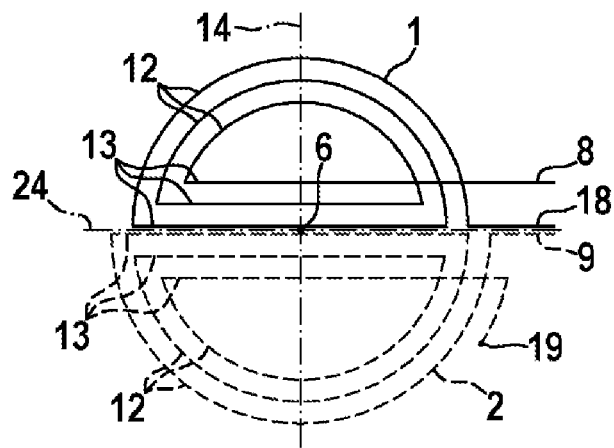
FIG. 4 shows another first transmitting coil and another first receiving subcoil.

FIG. 4 shows a first plane of an additional specific embodiment of a sensor, wherein the first transmitting coil 1 has windings which are arranged in a D shape. The first transmitting coil 1 has windings having arc-shaped sections 12 which are connected to straight sections 13. The arc-shaped first sections 12 are arranged symmetrically with respect to one another. The outermost arc-shaped section 12 has a first center point 6 as a circle center. A first line 14 is plotted in the first plane through the first center point 6. A second line 24 is plotted in the first plane perpendicularly to the first line 14. The straight sections 13 are arranged perpendicularly to the first line 14. The straight sections 13 and the arc-shaped sections 12 of the first transmitting coil 1 are arranged mirror-symmetrically with respect to the first line 14. Radial center points of the arc-shaped sections 12 are arranged along the first line 14. The radii of the individual arc-shaped sections each differ, for example, by the same value.

A first receiving subcoil 2 is arranged in the first plane of the first transmitting coil 1, the windings of which are also formed in a D shape. The first receiving subcoil 2 has windings having arc-shaped sections 12 which are connected to the straight sections 13. The arc-shaped first sections 12 are arranged symmetrically with respect to one another. The outermost arc-shaped section 12 has the radial first center point 6 as a circle center. The straight sections 13 are arranged perpendicularly to the first line 14. The straight sections 13 and the arc-shaped sections 14 of the first receiving subcoil 2 are arranged mirror-symmetrically with respect to the first line 14. Radial center points of the arc-shaped sections are arranged along the first line 14. The radii of the individual arc-shaped sections 12 each differ, for example, by the same value. The first transmitting coil 1 and the first receiving subcoil 2 are arranged mirror-symmetrically opposite with respect to the second line 24.

The first receiving subcoil 2 has the same number of windings as the first transmitting coil 1; however, the outermost arc-shaped first section 12 of the first receiving subcoil 2 has a larger radius than the outermost arc-shaped first section 12 of the first transmitting coil 1. Thus, the average diameter of the windings of the first receiving subcoil is larger than the average diameter of the windings of the first transmitting coil 1.

Figure 5:
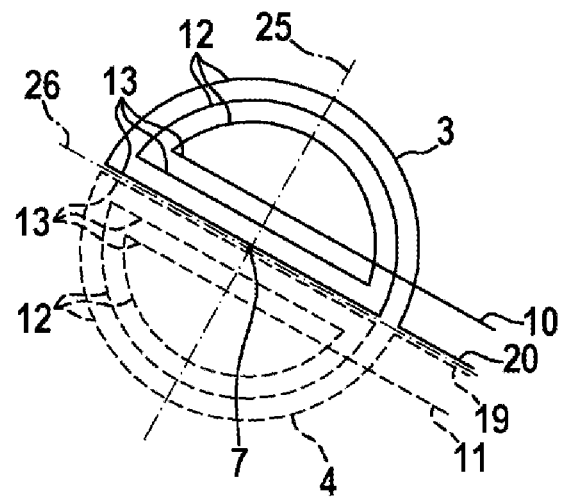
FIG. 5 shows another second transmitting coil and another second receiving subcoil.

FIG. 5 shows a second plane of the additional specific embodiment of the sensor having a second transmitting coil 3 and a second receiving subcoil 4. The second transmitting coil 3 has windings having arc-shaped sections 12 which are connected to straight sections 13. The arc-shaped first sections 12 are arranged symmetrically with respect to one another. The outermost arc-shaped section 12 has a second center point 7 as a circle center. A first additional line 25 is plotted in the second plane through the second center point 7. A second additional line 26 is plotted in the second plane perpendicularly to the first additional line 24. The straight sections 13 are arranged perpendicularly to the first additional line 25. The straight sections 13 and the arc-shaped sections 12 of the second transmitting coil 3 are arranged mirror-symmetrically with respect to the first additional line 25. Radial center points of the arc-shaped sections are arranged along the first additional line 25. The radii of the individual arc-shaped sections 12 each differ, for example, by the same value.

A second receiving subcoil 4 is arranged in the second plane of the second transmitting coil 3, the windings of which are also formed in a D shape. The second receiving subcoil 4 has windings having arc-shaped sections 12 which are connected to straight sections 13. The arc-shaped first sections 12 are arranged symmetrically with respect to one another. The outermost arc-shaped section 12 has the second center point 7 as a circle center. The straight sections 13 are arranged perpendicularly to the first additional line 25. The straight sections 13 and the arc-shaped sections 12 are arranged mirror-symmetrically with respect to the first additional line 25. Radial center points of the arc-shaped sections are arranged along the first additional line 25. The radii of the individual arc-shaped sections 14 each differ, for example, by the same value.

The second transmitting coil 3 has third leads 10, 20, via which a transmitting current is supplied to the second transmitting coil 3. The second receiving subcoil 4 has a fourth lead 11 via which a receiving signal detected by the second receiving subcoil 4 may be tapped. In addition, the second receiving subcoil 4 is connected to the first receiving subcoil 2 via the via 19, forming a receiving coil.

The second transmitting coil 3 is formed identically to the first transmitting coil 1. The second receiving subcoil 4 of FIG. 5 is formed differently from the first receiving subcoil 2 of FIG. 4. In the depicted exemplary embodiment, the second receiving subcoil 4 has an additional outermost arc-shaped section 12 which has a larger radius than the outermost arc-shaped section 12 of the first receiving subcoil 2. The outermost arc-shaped section of the second receiving subcoil 4 has the same radius as the outermost arc-shaped section 12 of the second transmitting coil 3. The second transmitting coil 3 has the same number of windings. Thus, the average radius of the windings of the first receiving subcoil 2 is larger than the average radius of the windings of the second receiving subcoil 4. Depending on the selected embodiment, the first receiving subcoil 2 may also have a winding having a larger radius.

The second transmitting coil 3 and the second receiving subcoil 4 are arranged on opposite sides with respect to the second additional line 26.

The second transmitting coil 3 has an arc-shaped outermost first sections 12 which a larger radius than the arc-shaped outer first section 12 of the first receiving subcoil 2 of FIG. 4. The arc-shaped first sections 12 of the second transmitting coil 3 and the second receiving subcoil 4 are arranged symmetrically with respect to the second center point 7.

Figure 6:
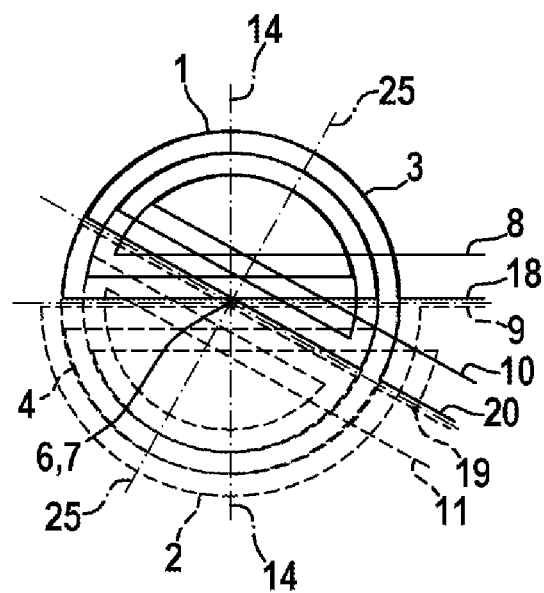
FIG. 6 shows the arrangement of the additional transmitting and receiving subcoils of FIGS. 4 and 5, one above the other.

FIG. 6 shows the arrangement of the first and the second plane of the sensor including the first transmitting coil 1 and the first receiving subcoil 2, and including the second transmitting coil 3, and including the second receiving subcoil 4 of FIGS. 4 and 5. The first transmitting coil 1 and the first receiving subcoil 2 are, for example, arranged on a first side of a printed circuit board, and the second transmitting coil 3 and the second receiving subcoil 4 are arranged on a second side. The first and the second receiving subcoil 2, 4 are connected to form an entire coil. The transmitting and receiving subcoils are arranged in such a way that the first and the second center point 6, 7 coincide. However, as is clearly apparent from FIGS. 4 and 5, the arrangement is rotated relative to one another, i.e., the first line 14 and the first additional line 25 are rotated relative to one another by a specified angle, in particular by 65° to 70°.

Depending on the selected specific embodiment, the first and the second receiving subcoil of a sensor may differ both in the number of windings as well as in the average radius of the arc-shaped sections 12.

Figure 7:
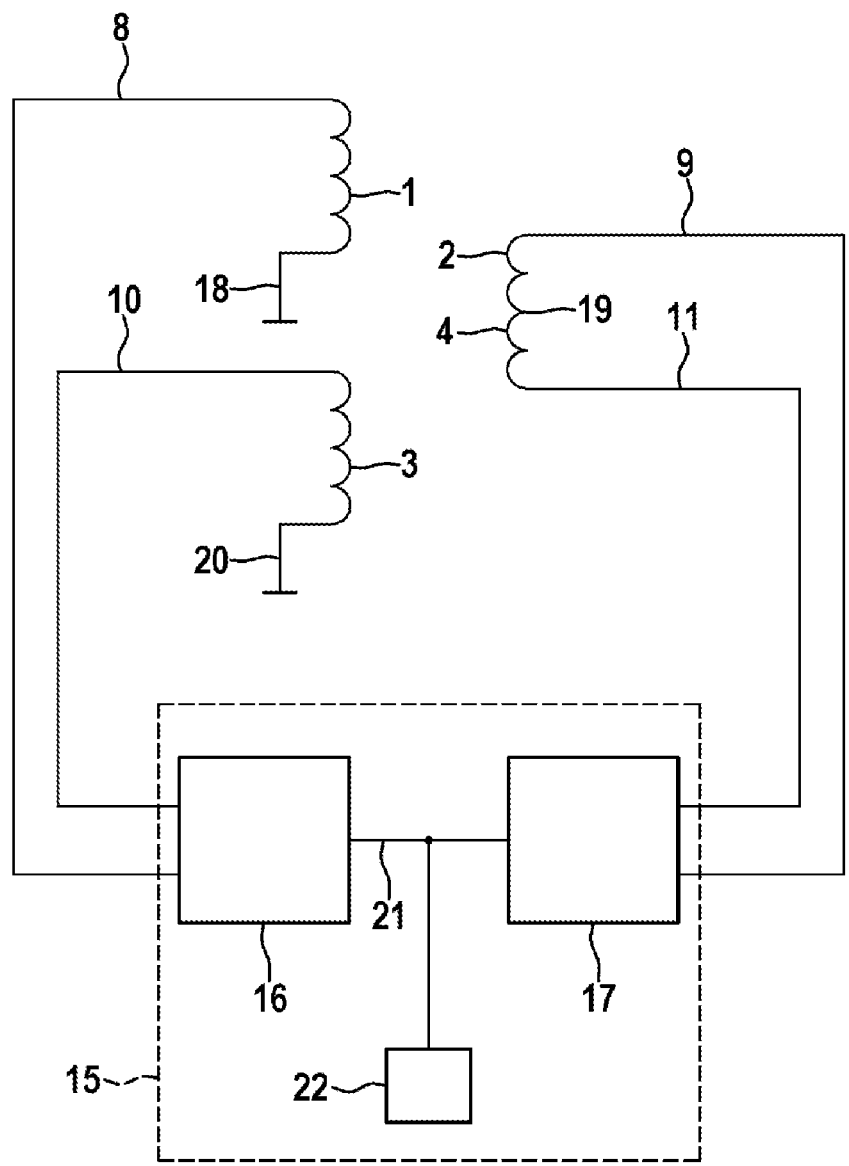
FIG. 7 shows a schematic representation of a circuit configuration for supplying current to the transmitting coils and for evaluating the receiving signal of the receiving coil.

FIG. 7 shows a schematic representation of a circuit 1, 5 for supplying the transmitting coils 1, 3 with current and for evaluating the receiving signal of the receiving subcoil 2, 4. The circuit 15 includes a current supply unit 16 for supplying the transmitting coils 1, 3 with current, and an evaluation unit 17 for evaluating the voltage signal of the receiving subcoils 2, 4. The current supply unit 16 and the evaluation unit 17 may be connected via a control line 21. Thus, for example, the magnitude of the voltages detected via the receiving subcoils 2, 4 may be passed to the current supply unit 16. Furthermore, for example, the phase of one of the transmitting currents or of both transmitting currents may thus be passed to the evaluation unit 17. The current supply unit 16 is, for example, designed in such a way that the amplitudes and/or phases of the currents of the transmitting coils are predefined and are independent of the receiving signal of the receiving subcoils 2, 4. The evaluation unit 17 is, for example, designed so as to evaluate the signal received at the receiving subcoils 2, 4 according to both amplitude and phase. Depending on the receiving signal, a metal or magnetic object in the area of the sensor may be detected by a monitoring unit.

The described arrangement is suitable in particular for a design of the transmitting and receiving subcoils in the two planes, wherein the two planes are arranged on a front and a rear side of a single printed circuit board. The coils may be designed in the form of printed coils, wherein the electrical lines of the coils are imprinted onto the printed circuit board.

Depending on the selected specific embodiment, the transmitting coils and the receiving subcoils may have shapes other than the D shape; in particular, they may be designed as circular coils.

The invention claimed is:

1. A sensor for locating metal or magnetic objects, the sensor comprising:
  a first transmitting coil having a plurality of windings arranged in a first plane and centered about a first line in the first plane;
  a second transmitting coil having a plurality of windings arranged in a second plane and centered about a third line in the second plane that is at a non-parallel angle relative to the first line in the first plane, the second plane being parallel with the first plane;
  a receiving coil formed from a series connection of a first receiving subcoil and a second receiving subcoil, the first receiving subcoil being directly connected to the second receiving subcoil, the first receiving subcoil having a plurality of windings arranged in the first plane and centered about the first line in the first plane, the second receiving subcoil having a plurality of windings arranged in the second plane and centered about the third line in the second plane;
  a current supply device connected to each of the first transmitting coil and the second transmitting coil and configured to supply the first transmitting coil and the second transmitting coil with currents; and
  an evaluation device directly connected to the first receiving subcoil and directly connected to the second receiving subcoil and configured to evaluate a voltage signal across the series connection of the first receiving subcoil and the second receiving subcoil,
  wherein the first transmitting coil and the first receiving subcoil are opposite one another with respect to a second line in the first plane, the second line in the first plane perpendicularly intersecting the first line in the first plane at a first center point in the first plane,
  wherein the second transmitting coil and the second receiving subcoil are opposite one another with respect to a fourth line in the second plane, the fourth line in the second plane perpendicularly intersecting the third line in the second plane at a second center point in the second plane, the first center point in the first plane and the second center point in the second plane being arranged so as to coincide with a central axis that is perpendicular to the first plane and the second plane, and
  wherein the first receiving subcoil and the second receiving subcoil have different inductances.

2. The sensor as claimed in claim 1, wherein the first line in the first plane and the third line in the second plane are arranged at an angle of 65° to 70° relative to one another.

3. The sensor as claimed in claim 1, wherein windings of the first receiving subcoil and the second receiving subcoil delimit different areas.

4. The sensor as claimed in claim 1, wherein the first receiving subcoil and the second receiving subcoil have different numbers of the windings.

5. The sensor as claimed in claim 1, wherein an average diameter of the windings of the first receiving subcoil differs from an average diameter of the windings of the second receiving subcoil.

6. The sensor as claimed in claim 1, wherein the windings of the first receiving subcoil have different spacings from one another in comparison to the windings of the second receiving subcoil.

7. The sensor as claimed in claim 1, wherein:
  each winding in the plurality of windings of the first transmitting coil comprises (i) a straight section arranged in parallel to the second line in the first plane and (ii) an arc-shaped section having a respective radial center point on the first line in the first plane;
  each winding in the plurality of windings of the second transmitting coil comprises (i) a straight section arranged in parallel to the fourth line in the second plane and (ii) an arc-shaped section having a respective radial center point on the third line in the second plane;
  each winding in the plurality of windings of the first receiving subcoil comprises (i) a straight section arranged in parallel to the second line in the first plane and (ii) an arc-shaped section having a respective radial center point on the first line in the first plane; and
  each winding in the plurality of windings of the second receiving subcoil comprises (i) a straight section arranged in parallel to the fourth line in the second plane and (ii) an arc-shaped section having a respective radial center point on the third line in the second plane.

8. The sensor as claimed in claim 7, wherein:
  the arc-shaped section of an outermost winding in the plurality of windings of the first transmitting coil has its respective radial center point at the first center point in the first plane and on the central axis;
  the arc-shaped section of an outermost winding in the plurality of windings of the second transmitting coil has its respective radial center point at the second center point in the second plane and on the central axis;
  the arc-shaped section of an outermost winding in the plurality of windings of the first receiving subcoil has its respective radial center point at the first center point in the first plane and on the central axis; and the arc-shaped section of an outermost winding in the plurality of windings of the second receiving subcoil has its respective radial center point at the second center point in the second plane and on the central axis.

9. A sensor for locating metal or magnetic objects, the sensor comprising:
- a first transmitting coil having a plurality of windings arranged in a first plane and centered about a first line in the first plane;
- a second transmitting coil having a plurality of windings arranged in a second plane and centered about a third line in the second plane that is at a non-parallel angle relative to the first line in the first plane, the second plane being parallel with the first plane;
- a receiving coil formed from a series connection of a first receiving subcoil and a second receiving subcoil, the first receiving subcoil being directly connected to the second receiving subcoil, the first receiving subcoil having a plurality of windings arranged in the first plane and centered about the first line in the first plane, the second receiving subcoil having a plurality of windings arranged in the second plane and centered about the third line in the second plane;
- a current supply device connected to each of the first transmitting coil and the second transmitting coil and configured to supply the first transmitting coil and the second transmitting coil with currents; and
- an evaluation device directly connected to the first receiving subcoil and directly connected to the second receiving subcoil and configured to evaluate a voltage signal across the series connection of the first receiving subcoil and the second receiving subcoil, wherein the first transmitting coil and the first receiving subcoil are opposite one another with respect to a second line in the first plane, the second line in the first plane perpendicularly intersecting the first line in the first plane at a first center point in the first plane, wherein the second transmitting coil and the second receiving subcoil are opposite one another with respect to a fourth line in the second plane, the fourth line in the second plane perpendicularly intersecting the third line in the second plane at a second center point in the second plane, the first center point in the first plane and the second center point in the second plane being arranged so as to coincide with a central axis that is perpendicular to the first plane and the second plane, wherein the first receiving subcoil and the second receiving subcoil have different inductances, and wherein at least one of (i) the first receiving subcoil and the second receiving subcoil have different numbers of the windings, (ii) an average diameter of the windings of the first receiving subcoil differs from an average diameter of the windings of the second receiving subcoil, and (iii) the windings of the first receiving subcoil have different spacings from one another in comparison to the windings of the second receiving subcoil.

* * * * *